United States Patent [19]
Crawford et al.

[11] Patent Number: 5,373,487
[45] Date of Patent: Dec. 13, 1994

[54] DISTRIBUTED ACOUSTIC SENSOR

[75] Inventors: Brian B. Crawford; Robert J. Prenovost; Judy K. Burden, all of Huntsville; Jeff C. Robinson, Faulkville; Aris Tanone, Huntsville, all of Ala.

[73] Assignee: Mason & Hanger National, Inc., Huntsville, Ala.

[21] Appl. No.: 62,563

[22] Filed: May 17, 1993

[51] Int. Cl.$^5$ .................. H04R 23/00; G01B 9/02
[52] U.S. Cl. ........................ 367/149; 73/655
[58] Field of Search ............... 367/149; 356/4.5, 345; 73/655, 657

[56] References Cited

U.S. PATENT DOCUMENTS

| | | | |
|---|---|---|---|
| 4,310,905 | 1/1982 | Palmer | 367/149 |
| 4,446,543 | 5/1984 | McLandrich et al. | 367/149 |
| 4,482,805 | 11/1984 | Palmer | 367/140 |
| 5,247,490 | 9/1993 | Goepel et al. | 367/149 |
| 5,249,163 | 9/1993 | Erickson | 367/149 |

Primary Examiner—Ian J. Lobo
Attorney, Agent, or Firm—Roy P. Collins

[57] ABSTRACT

A distributed acoustic sensor utilizing a Fizeau type fiber optic transducer and a distributed acoustic collector to gather and return acoustic disturbances from remote areas in buried, underground, or underwater installations. A light beam from a laser or LED source is transmitted over a fiber to a remote transducer which is coupled to a distributed acoustic collector. The collector may be an extended pipe or tube system filled with an acoustic conducting medium such as air or an appropriate liquid which communicates with the sensing diaphragm in the transducer. An interference beam whose characteristics are a function of the diaphragm motion is created in the transducer and transmitted back over the common single fiber toward the source. An in-line optical coupler/splitter diverts a portion of the returning modulated beam to a photodetector which outputs a proportional electrical signal to an electronic circuit for amplification and analysis.

4 Claims, 3 Drawing Sheets

DISTRIBUTED ACOUSTIC SENSOR

BACKGROUND OF THE INVENTION

1. Field of the Invention

The present invention relates to the field of acoustic sensors, and more particularly to a distributed sound gathering device with an interferemetric fiber optic sound transducer.

2. Description of the Related Art

Point acoustic sensors are generally referred to as microphones, hydrophones, geophones or the like depending on the medium in which they are designed to operate. Such devices generally are placed at a single point and respond to acoustic waves which travel to them through the medium, such as air, from a remote source. The acoustic wave which impinges on the sensor is much weaker at the sensor than at the source for two primary reasons. First is the dispersion of energy from the source which causes the power density of the acoustic field to fall off approximately as $1/R^2$ where R is the distance from the source. Second, acoustic energy is dissipated by the lossy characteristics of the medium as the acoustic waves travel through the medium. This loss is often referred to as attenuation. The sum of these two primary effects and others is that the intensity of the acoustic energy is much reduced at points remote from the source, and the degree of reduction is dependent on the physical properties of the medium.

It is well known that water is an excellent acoustic conductor, air is a fair conductor, and most granular soils are very poor conductors. As a result, microphones in air are normally used in close proximity to the source such as a speaker, whereas hydrophones may be used to collect sounds in water from sources at great distances. On the other hand, microphones, or more aptly geophones, are not much used in soils because of the high attenuation and dispersion of sound in soils. However there are numerous applications where effective acoustic sensors in soils would be very desirable. Notable examples are systems for detection and identification of vehicular traffic passing over the ground, or systems which can detect intrusions into protected areas such as public utility facilities or government reservations. There are often physical or operational reasons why the sensors must be located at considerable distances from the sources of interest. This necessarily means that the signals at the sensor are weak, and there is much intervening space in which extraneous noise can intrude. While the low signal levels might be overcome by use of very high amplification, this is often ineffective because of the high noise mixed with the signal which is equally amplified. Moreover, when high amplification is used in conjunction with conventional electromagnetic transducers, there is the additional severe problem of inductive pick-up of electromagnetic noise from sources such as power lines.

An effective approach to overcome these problems is to provide a widely distributed sensor in the soil which can respond to acoustic inputs nearer their source over a large area and which is not susceptible to electromagnetic interference. One such approach is the Distributed Fiber Optic Sensing System disclosed in copending U.S. patent application Ser. No. 07/903,358 filed on Jun. 24, 1992 by Brian B. Crawford et al and assigned to the present assignee. This disclosure is incorporated herein by reference. The distributed sensor of that application is an extensive loop of optical fiber cable which is operated as the sensitive element of a fiber Sagnac interferometer. This loop may be up to several tens of kilometers in length and may completely surround a facility to be monitored. It is convenient to either bury the sensing fiber or incorporate it into an existing structure such as a fence. In this case the fiber is a very low loss optical waveguide which is sensitive to acoustic or mechanical disturbances over its entire length, and conveys the signal back to the signal analysis center with very little attenuation or additional noise.

The applications and advantages of such a distributed Sagnac fiber sensing system are set forth in U.S. patent application Ser. No. 07/903,358. However, some improvements are desirable in certain applications. In particular, the burial and protection of the extensive fiber loop may be too expensive for some situations. Also, there are occasions where higher sensitivity in a more localized area may be desirable, for example under a specific road. Another desired feature is the possibility of economical placement of multi-element arrays to provide location and ranging information with appropriate signal processing means. What is desired and has not yet been provided by the prior art are improvements to distributed fiber sensing systems which provide low cost distributed sound collecting means, higher sensitivity for low level disturbances, and practical means for multi-sensor directional arrays.

SUMMARY OF THE INVENTION

The present invention provides an acoustic sensing system which incorporates a distributed acoustic collector for gathering acoustic disturbances over a wide area and conveying the resulting acoustic energy with relatively low attenuation back to an acousto-optical transducer. In the preferred embodiment the transducer is an optical interferometer of the Fizeau type. A light source, which may be a laser or light emitting diode (LED), injects light into a fiber connected to the first port of an optical coupler which passes this first light beam out through an extended fiber connected to the second port of the coupler. This extended fiber connects to the interferometric transducer at a remote point, where the transducer is connected to the acoustic collector. The end of the fiber is polished at a right angle to its axis, and this end is firmly fixed in position close to a diaphragm of the transducer which is in communication with the acoustic energy delivered by the acoustic collector. The area of the diaphragm adjacent to the fiber end is reflective, and the surface of the diaphragm is parallel to the surface of the polished fiber end. As the first beam of light from the light source reaches the end of the fiber, it experiences a partial Fresnel reflection at the glass to air interface at the fiber end. The remaining portion of the first beam passes through the interface and across the gap to the reflective surface of the diaphragm. There a portion of the first beam is reflected back along the axis of the beam and into the fiber end where it recombines with the first portion which was internally reflected from the fiber end. If the coherence length of the light source is slightly greater than twice the thickness of the gap, these two reflected beams are coherent and they interfere within the fiber as they recombine into a second light beam returning to the source. The phase difference between these two portions depends on the difference in their path lengths, which in this case is twice the thickness of the gap between the fiber end and the reflective diaphragm surface. As the diaphragm moves in response to the acoustic energy which impinges on it from the collector, the thickness of the gap varies so that the phase difference between the two reflected light beam portions also varies. This results in an intensity modulation of the resultant recombined second beam in the fiber whose frequency is a function of the frequency of movement of the diaphragm and whose amplitude is a function of the degree of displacement of the diaphragm.

The acoustic collector connected to the transducer is a long hollow tube having one or more branches and which may be extended over a wide area, thereby allowing the sensing area to be enlarged. The collector tube is filled with an acoustic conducting medium which advantageously has a low acoustic attenuation relative to the surrounding medium in which the collector is embedded, eg. granular soil. In the preferred embodiment when the collector is buried in soil, an effective conducting medium is air. The transducer is connected to the collector tube in a manner such that the acoustic conducting medium is in communication with the diaphragm of the transducer. Means are provided in the transducer to equalize static pressures across the diaphragm. The collector operates to intercept pressure waves in the soil caused by acoustic or mechanical disturbances. These pressure waves are coupled through the walls of the collector to the conducting medium inside, and they are conducted by the medium down the tube to the diaphragm of the transducer. By appropriate selection of the material and geometry of the tube, and the material of the conducting medium, attenuation of the pressure waves conveyed to the diaphragm through the collector tube is much less than that which it would suffer if travelling directly thorough the soil to the transducer. The pressure waves convey the acoustic energy which causes the diaphragm of the transducer to vibrate sympathetically.

The second beam which has been modulated by the acoustic energy from the acoustic collector returns through the fiber back into the second port of the optical coupler. There it is split into two portions, one of which exits a third port of the coupler and passes through a connecting fiber to a photoelectric diode. The second portion exits through the first port toward the light source where it has no significant effect. The portion which falls on the photoelectric detector is converted to a corresponding electrical current whose frequency is a function of the acoustic disturbance, and whose amplitude is a function of the amplitude of the disturbance. This output current is virtually identical in nature to that provided from the analogous photoelectric detector of the Distributed Fiber Optic Sensing System of copending U.S. patent application Ser. No. 07/903,358 referenced herein above. The electronic circuit of that invention is advantageously used for amplification and analysis of the output current of the present invention. In particular, the output current may be amplified and provided as audible output to an operator, or as an input signal to other measurement instruments such as oscilloscopes, recorders, spectral analyzers, etc. Also, signal analysis and computing means are provided to compare the distinctive spectral, amplitude, and time patterns of disturbance signals to known patterns to identify the type, nature, and source of detected disturbances.

It is therefore a principal object of the present invention to provide a distributed acoustic sensor of high sensitivity which may be buried or placed above ground or under water in advantageous position relative to acoustic sources of interest.

It is another object of the present invention to provide a distributed acoustic sensor of high sensitivity which may be placed within or adjacent to structures, machines, vehicles, aircraft, living bodies, etc. in advantageous position relative to acoustic sources of interest.

It is another object of the present invention to provide an extended acoustic collector which can collect acoustic disturbances over a wide remote area and convey the resulting energy with low distortion and attenuation to a sensitive transducer.

It is yet another object of the present invention to provide a distributed acoustic sensor having an acoustic collector of inexpensive materials which may be economically buried or otherwise disposed over a wide area.

It is another object of the present invention to provide a distributed acoustic sensor which is immune to electromagnetic interference such as caused by power line influence, lightning, radio transmission, etc.

It is also an object of the invention to provide a distributed acoustic sensor having means whereby the type, nature, and source of an acoustic disturbance can be determined by suitable amplitude, spectral, and time series analysis of the signals.

Other objects, advantages, and features of the invention will become apparent from the following description and accompanying drawings, showing only a preferred embodiment of the invention.

DETAILED DESCRIPTION OF THE INVENTION

Figure 1:
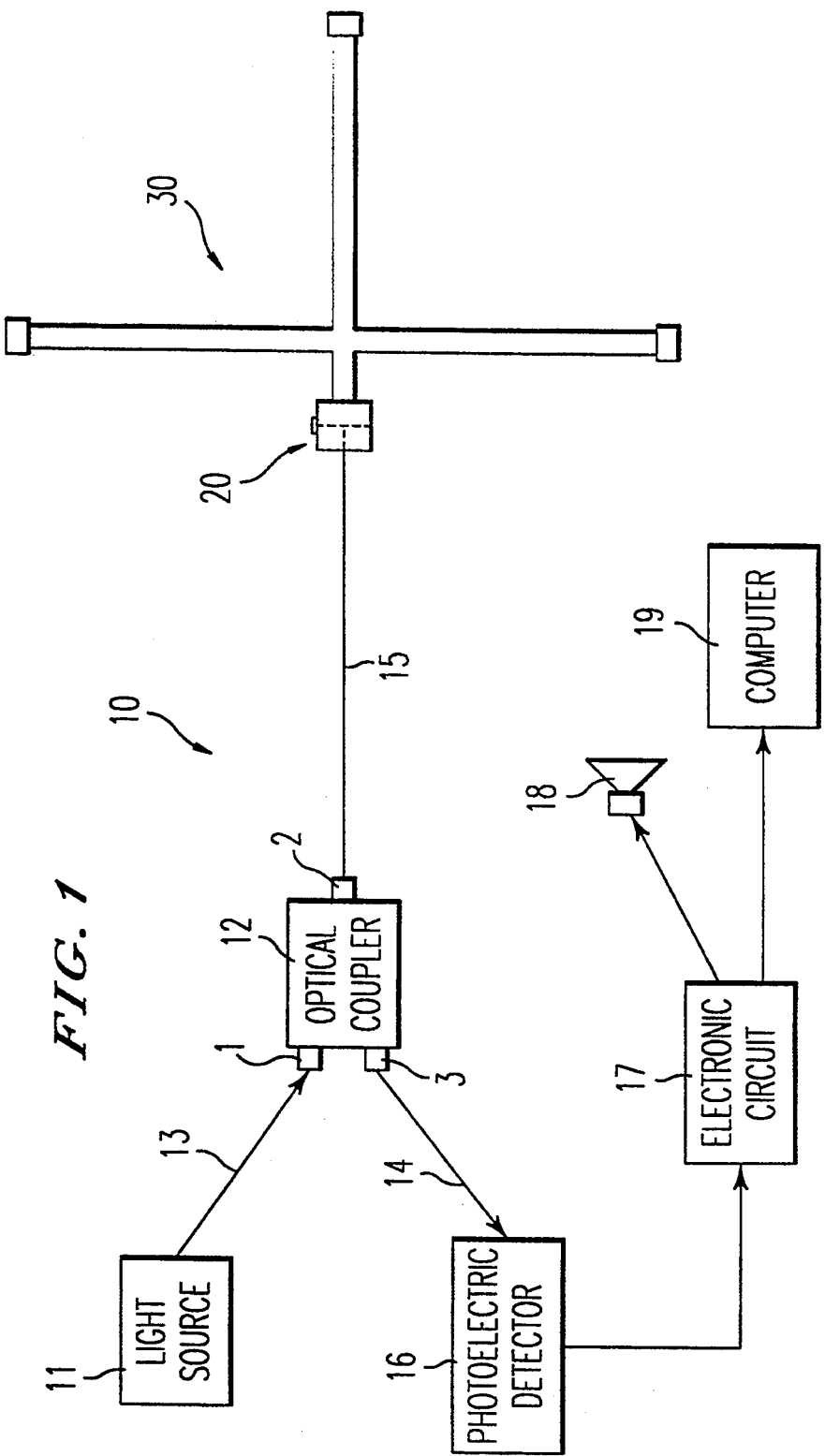
FIG. 1 is a schematic view of the distributed acoustic sensor of the present invention.

Referring now to the drawings in which like numbers represent like parts, FIG. 1 shows the overall schematic of a distributed acoustic sensor, designated generally by the number 10. The acoustic sensor 10 includes a light source 11 which is preferably a semiconductor laser whose output is connected by an optical fiber 13 to port 1 of an optical coupler 12. Light from source 11 is conveyed out through pore 2 of the coupler into a fiber 15 which extends to a transducer 20. A photoelectric detector 16 is connected by fiber 14 to port 3 of the coupler 12. In the preferred embodiment the fibers 13, 14, and 15 are single mode fibers of transmission grade. However multimode fibers may be used in systems where less sensitivity is needed. Fiber 15 may be a single length of fiber, or may comprise two or more lengths joined as required by splices or connectors to facilitate construction and placement of the distributed acoustic sensor 10.

Figure 2:
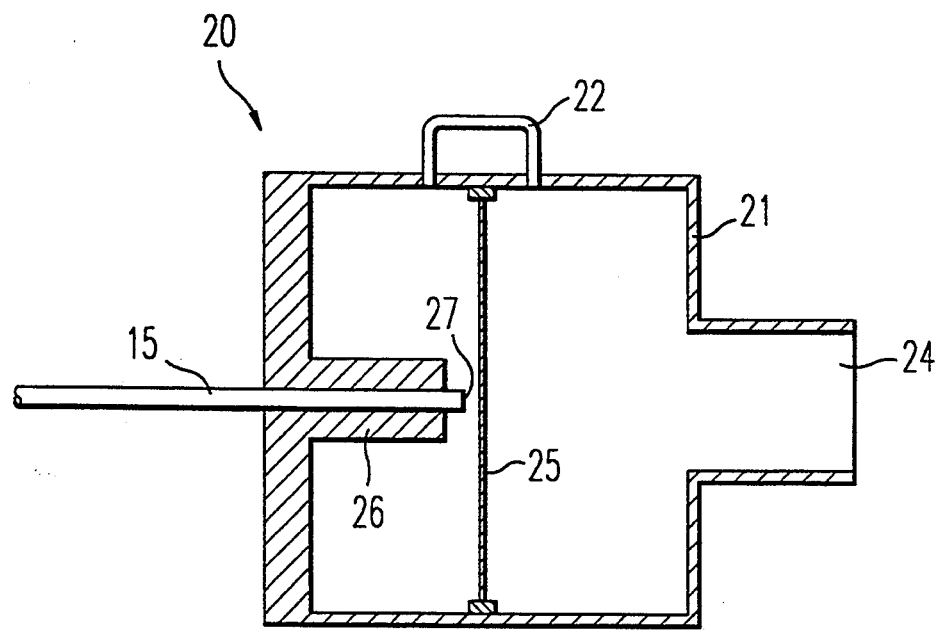
FIG. 2 is a more detailed schematic view of the transducer of this invention.
Figure 3:
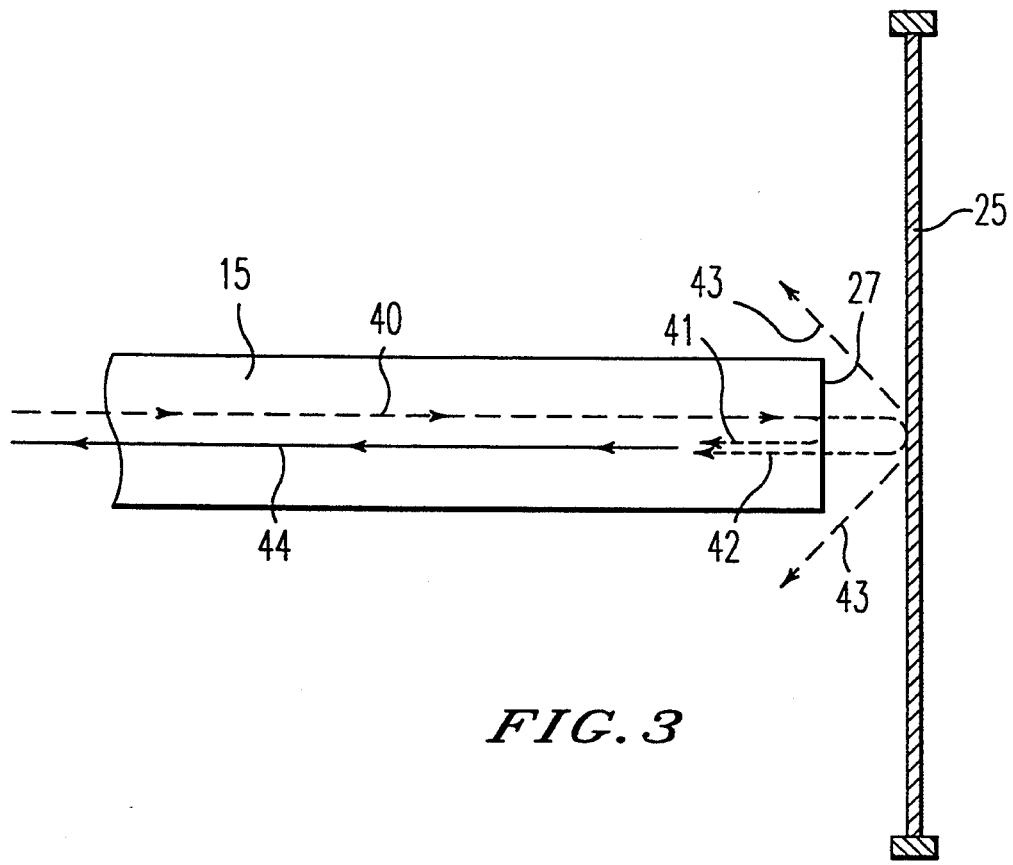
FIG. 3 is a diagram of the interferometric operation within the transducer.

Fiber 15 is connected to transducer 20 whose acoustic side is in turn connected to acoustic collector 30. Referring now to FIGS. 2 and 3, there are shown details of transducer 20. Housing 21 encloses an acoustic chamber 24 which is in communication with the interior of acoustic collector 30. A diaphragm 25 spans the acoustic chamber 24. Fiber 15 is firmly supported in a fixture 26 which is mounted to the common housing 21 of the transducer 20 such that its end 27 is held in a fixed position close to the surface of diaphragm 25. End 27 of fiber 15 is a flat surface which is polished at a right angle to the axis of fiber 15 and is fixed in fixture 26 such that the surface of end 27 is parallel to the opposing surface of diaphragm 25. A passageway, which in the preferred embodiment is a capillary tube 25, connects the chambers on either side of diaphragm 25, thereby equalizing any static pressure differential which might develop across the diaphragm 25.

Figure 4:
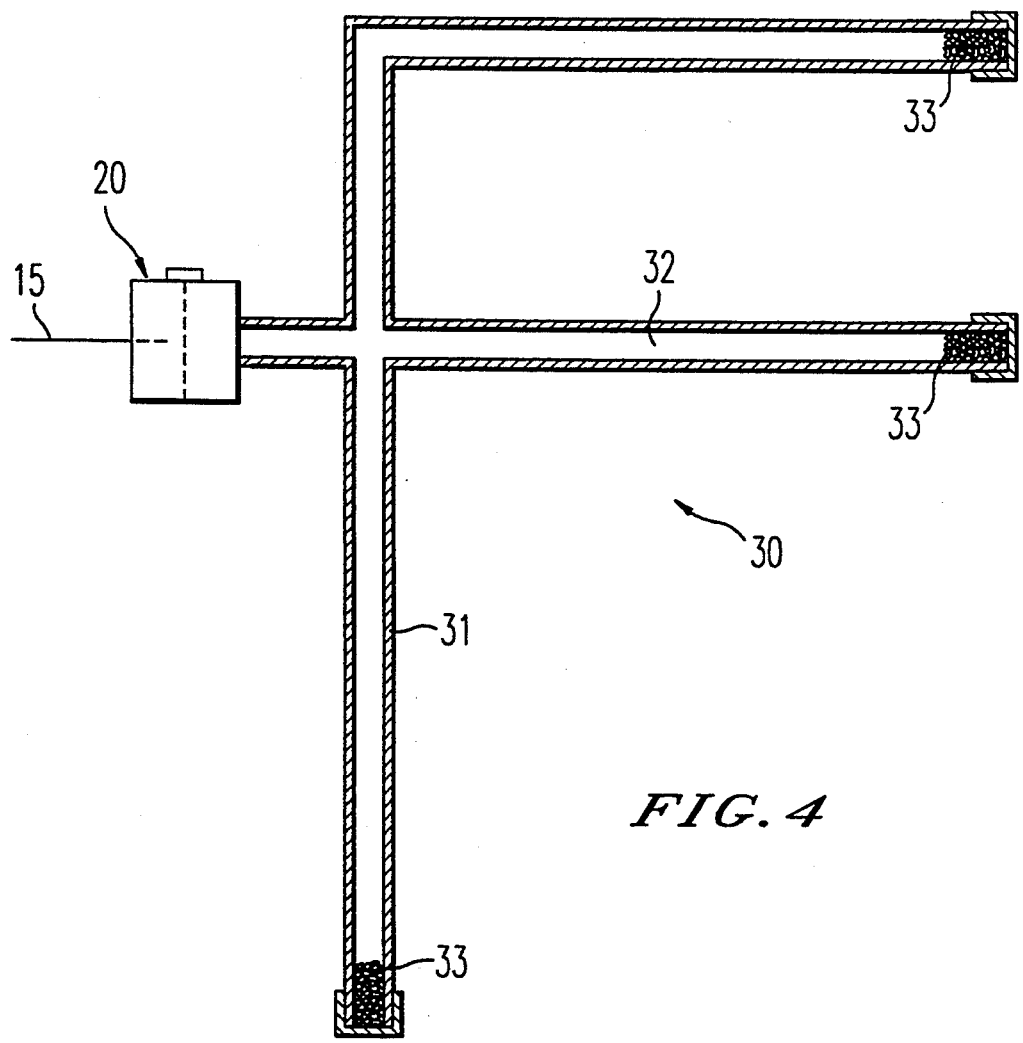
FIG. 4 is a detailed schematic view of the acoustic collector.

Acoustic collector 30 is schematically depicted in more detail in FIG. 4. There is shown a multi-branched configuration of a typical application. Collector 30 comprises joined sections of pipe or tubing which are capped and sealed against the environment at their joints and distal ends. The interior of tubes 31 are filled with a low-loss acoustic conducting medium 32 which is continuous throughout collector 30 and also is in contact with the surface of diaphragm 25 via acoustic chamber 24 of transducer 20. In the preferred embodiment areas at the ends of branches and at major transition points of tubes 31 may be filled with acoustic dissipating material 33 to eliminate reflections and thereby prevent the build up of standing waves and resonances within the extended tubes 31. Such resonances are generally undesirable in that they cause sharp peaks in the frequency response of the system, thereby interfering with faithful transmission and reproduction of detected sounds. Material 33 is selected to have very high acoustic energy absorbing and dissipating properties within the medium 32 in which it is embedded. In the case where air is used for the conducting medium 32, a sound absorbing packing of rubberized fiber such as horse hair is suitable.

In a typical applications single or multiple sensors 10 and/or collectors 30 may be buried several inches below the surface of the soil in a widely distributed fashion. In other examples, they may be embedded in concrete or asphalt, buried under such materials, placed underwater, or above ground in walls, structures, or the air. Applications also include use of existing channels within structures or cavities within structures or materials which exist for other primary purposes as acoustic collectors 30. Examples include sewer lines, gas pipes, tunnels, channels within composite structures, hollow spaces within aircraft wings, etc. In medical applications acoustic collector 30 may be a blood vessel, trachea, or other extended cavity within the body. Also, a fluid filled mattress on which a patient lies may be used as an acoustic collector 30 for monitoring the sounds of blood flow, respiration, cardiac activity, etc. Other similar applications will be apparent to those skilled in the art, and it is not intended that the invention be limited to the above examples. In operation an acoustical disturbance produces pressure waves in the surrounding medium, e.g. soil, which impinge on portions of collector 30. Corresponding pressure waves are coupled through the walls of tubes 31 into the conducting medium 32. These pressure waves are then conducted through tubes 31 by the medium 32 to transducer 20 where they impinge on diaphragm 25 via chamber 24. The behavior of collector 30 is complex and dependent on a number of factors including the diameter, wall thickness, material, and elasticity of tubes 31, the material of medium 32, etc. Performance for various applications will be enhanced by proper selection of these parameters. In the preferred embodiment for buried applications the tubes 31 are rigid polyvinylchloride plastic and the medium 32 is air. However, other gasses, liquids, or gels may advantageously be used for medium 32, and metals, other plastics, elastomers, etc. may be used for tubes 31.

Referring now to FIG. 3, it is shown that the pressure waves impinging on diaphragm 25 set it in motion and cause variation of the gap between the surface of diaphragm 25 and end 27 of fiber 15. A first light beam 40 is conveyed to the transducer 30 from light source 11. Beam 40 is partially reflected internally from the glass/air interface of polished end 27, and the partially reflected portion propagates back toward the source as a component 41. A portion of first beam 40 passes through end 27 and across the gap to the surface of diaphragm 25 where it is reflected. Upon emerging from the end 27 the beam diverges such that some reflected portions 43 do not re-enter the end of fiber 15. However, some portion of the beam is retroreflected along the fiber 15 axis such that it re-enters the fiber as component 42. Provided that the light source 11 has a coherence length which is somewhat greater than twice the gap thickness, components 41 and 42 are coherent and will interfere within fiber 15 to form a resultant second beam 44 which propagates back toward coupler 12. In operation this is a Fizeau interferometer wherein the phase relationship between components 41 and 42 and the interference pattern of resultant second beam 44 depend on the distance from fiber end 27 to diaphragm 25. Variations in this gap which are caused by vibration of diaphragm 25 are thereby translated into variations of intensity of resultant second beam 44. The frequency of variation of beam 44 is a function of the vibratory motion of diaphragm 25, and the amplitude of the variation is a function of the amplitude of vibration of diaphragm 25. The transducer 30 is extremely sensitive because motion of diaphragm 25 on the order of one micron can cause the interference of components 41 and 42 to shift from totally destructive to totally constructive. The sensitivity is enhanced when the end 27 is close enough to the diaphragm 25 to maximize capture of reflected light without contacting the moving surface, and when components 41 and 42 are of the same intensity in fiber 15. The first condition is controlled by adjusting the initial gap between end 27 and the surface of diaphragm 25 during assembly. The latter condition may be adjusted by coating end 27 with a partially reflective metallic or dielectric coating as is common in the art. Appropriate reflectivity of the surface of diaphragm 25 can be provided by using a reflective material for the diaphragm 25 or by coating the surface in the active area with a reflective metal or dielectric coating. Metallized polyester film such as MYLAR or etched silicon are two examples of many reflective materials which may be successfully used for diaphragm 25.

Second light beam 44 is conveyed by fiber 15 back to port 2 of coupler 12 where it is split into two components. One component exits port 1 and travels back to source 11 where it has no significant effect. The other portion of beam 44 travels through fiber 14 to photoelectric detector 16 which produces an electric current proportional to the intensity of beam 44. This electrical signal from detector 16 is conveyed to electronic circuit 17 where it is amplified, filtered, and processed to produce, for example, an audible output from speaker 18 and an equivalent digital output to computer 19. Computer 19 performs spectral and time series analysis to provide information on the type, nature, and source of the originating acoustic disturbance. Other measurements and analyses of the output of detector 16 as are known in the art may be made to provide additional information on the disturbance.

The above description and disclosure of the invention are illustrative of the preferred embodiments. However, it will be apparent to those skilled in the art that various arrangements and substitutions of components may be made which embody the principles of the invention and fall within its scope and spirit.

We claim:

1. A distributed acoustic sensor comprising:
   a) a light source for injecting a first light beam into a first optical fiber;
   b) optical coupling means connected by a first port to said first optical fiber from the light source for conveying said first light beam to a second port of the coupling means, and for conveying a portion of a second light beam entering the second port to a third port of the coupling means;
   c) a second optical fiber connected to the second port of the coupling means for conveying the first light beam to a remote point;
   d) transducing means connected to said second optical fiber at the remote point for receiving said first light beam, sensing acoustic energy, producing said second light beam responsive to the combination of the acoustic energy and said first light beam, and injecting said second light beam back into said second optical fiber;
   e) a photoelectric detector connected by a third fiber to the third port of the optical coupling means, thereby receiving a portion of said second light beam returned from said transducer means;
   f) an electronic circuit connected to the photoelectric detector for processing the electrical output of the photoelectric detector resulting from changes in the intensity of the second light beam in response to acoustic energy sensed by said transducer means; and
   g) an extended acoustic collector connected to said transducing means which comprises:
      i) a hollow member enclosing an internal cavity and having at least one branch; and
      ii) an acoustic conducting medium filling the internal cavity of the hollow member which is in acoustic communication with the transducing means for collecting and conveying acoustic energy to the transducing means.

2. The distributed acoustic sensor of claim 1, wherein the hollow member is of tubular cross-section.

3. The distributed acoustic sensor of claim 1, wherein the acoustic collector further comprises acoustic energy absorbing means embedded in the acoustic conducting medium and filling at least a portion of the internal cavity for minimizing standing waves and resonances within the acoustic collector.

4. The distributed acoustic sensor of claim 1 wherein said transducing means further comprises pressure conducting means for equalizing static pressure differentials which build up within said transducing means to prevent changes in sensitivity, and distortion or damage thereby to any components of said transducing means.

* * * * *